Figure 1:
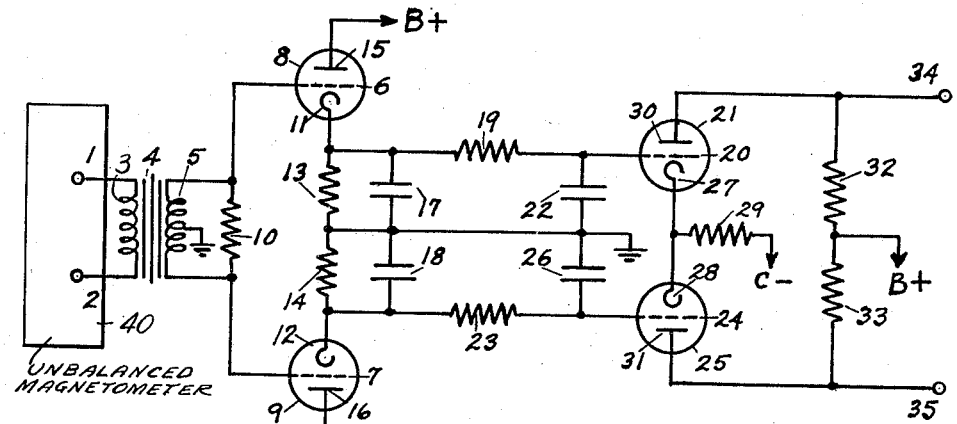

July 20, 1954 — O. H. SCHMITT — 2,684,465

DETECTION SYSTEM

Filed April 18, 1944

INVENTOR
Otto H. Schmitt
BY
ATTORNEY

Patented July 20, 1954

2,684,465

UNITED STATES PATENT OFFICE 2,684,465

DETECTION SYSTEM

Otto H. Schmitt, Port Washington, N. Y., assignor to the United States of America as represented by the Secretary of the Navy Application April 18, 1944, Serial No. 531,624

5 Claims. (Cl. 324—43)

This invention relates to an improved detection system, particularly to a detection system adapted for converting an input signal comprising a series of pulses of alternate polarity and varying magnitude into an output signal whose magnitude is substantially proportional to the difference in magnitude of the alternate input-signal pulses.

Magnetometers of the permeability type have been proposed in the past for the purpose of measuring either the absolute value of or small changes in a magnetic field, and more particularly the earth's magnetic field. Certain types of such magnetometers which have proved particularly useful in these applications provide an electrical output comprising a series of pulses of alternate polarity and of varying magnitude. Information as to the strength of the magnetic field undergoing measurement was conveyed by the magnitude of these pulses, and the direction of the magnetic field could be determined by observing the polarity of the pulse at a given instant.

It was early appreciated that the pulsed output from such magnetometers in its unchanged form did not lend itself effectively to either indication or recording. Various detection or demodulation arrangements were therefore proposed, for the purpose of converting the pulsed output of the magnetometer into a relatively steady direct current, the magnitude of which would provide information as to the strength of the magnetic field, while its polarity would indicate the direction of the field. Early types of two-sided detectors for accomplishing such demodulation were relatively unsatisfactory due to the low rectification efficiency and to the wide disparity in rectification between the two sides of the circuit. Furthermore, the output from such detectors did not directly provide an indication of the difference in the heights of the alternate positive and negative pulses supplied by the magnetometer.

It is an object of the present invention, therefore, to provide an improved detection system which is especially adapted for use with permeability-type magnetometers. The improved detection system of the present invention accomplishes demodulation in a manner which provides relatively close balance between the two sides of the circuit, and provides as an additional feature means for securing directly an indication of the difference in magnitude of the demodulated output in the two sides of the circuit.

While the improved detection system here disclosed is adapted for use with any magnetometer of the permeability type which utilizes an alternating driving voltage, its operation is particularly advantageous in conjunction with the unbalanced magnetometer described in my copending application, Serial No. 516,612, filed January 1, 1944, now Patent No. 2,560,132 issued July 10, 1951.

In accordance with the present invention, means are provided for converting an input signal comprising a series of pulses of alternate polarity and varying magnitude into an output signal whose magnitude is substantially proportional to the difference in magnitude of the alternate input-signal pulses. These means include a balanced demodulator of the cathode-follower type feeding into a capacitive load, a low-pass filter network, and a cathode phase inverter comprising a pair of vacuum tubes having a common cathode resistor and separate loads.

For a better understanding of the invention, together with other and further objects thereof, reference is made to the following description, taken in connection with the accompanying drawings, and its scope will be pointed out in the appended claims.

In the accompanying drawings:

Fig. 1 is a circuit diagram of a detection system in accordance with the present invention; and Figs. 2a, 2b, 2c and 2d show, in graphical form, the voltages appearing at various points in the circuit of Fig. 1.

Referring now to Fig. 1 of the drawings, input terminals 1 and 2 are connected to primary winding 3 of transformer 4, the center tap of secondary winding 5 of which is grounded. The terminals of secondary winding 5 are connected respectively to control grids 6 and 7 of vacuum tubes 8 and 9. Secondary winding 5 is shunted by resistor 10. Cathodes 11 and 12, respectively of vacuum tubes 8 and 9, are connected together by means of resistors 13 and 14 in series, the junction of which is grounded. Plates 15 and 16, respectively of vacuum tube 8 and 9, are connected to a source of positive potential as indicated by B+. Resistors 13 and 14 are respectively shunted by capacitors 17 and 18, thus providing a capacitive load for each of vacuum tubes 8 and 9.

Cathode 11 of vacuum tube 8 is connected through resistor 19 to control grid 20 of vacuum tube 21. Capacitor 22 is connected between control grid 20 and ground. Likewise, cathode 12 of vacuum tube 9 is connected through resistor 23 to control grid 24 of vacuum tube 25, and capacitor 26 is connected between control grid 24 and ground. Cathodes 27 and 28, respectively of vacuum tubes 21 and 25, are connected together and their junction is connected through common cathode-bias resistor 29 to a source of negative potential as indicated by C—. Plates 30 and 31, respectively of vacuum tubes 21 and 25, are connected through load resistors 32 and 33, respectively, to a source of positive potential as indicated by B+. Output terminals 34 and 35 are connected respectively to plates 30 and 31 of vacuum tubes 21 and 25.

The operation of the detection system shown diagrammatically in Fig. 1 of the drawings will be better understood by first considering how the circuit functions under static conditions, with no input signal applied to terminals 1 and 2. Vacuum tubes 8 and 9, which are preferably triodes having a relatively high amplification factor, are each biased almost to cutoff due to the presence of resistors 13 and 14, respectively, in their cathode circuits. Under this condition, each of these vacuum tubes functions as a demodulator, since negative swings in the applied grid voltage cause no appreciable change in the plate current, whereas positive swings produce a substantially proportional increase in the plate current. Furthermore, each of these tubes operates as a so-called cathode follower, in that the output signal is developed across cathode resistors 13 and 14, no load impedance being included in the circuits to plates 15 and 16. Regardless of the wave form of the applied grid voltage, the output voltage developed across cathode resistor 13 or 14 can increase rapidly, but can decrease no faster than capacitor 17 or 18 can discharge through its associated resistor 13 or 14.

Rather than utilizing directly the signal voltages appearing across resistors 13 and 14 to excite control grids 20 and 24 of vacuum tubes 21 and 25, each of these output voltages is passed through a low-pass filter comprising series resistor 19 or 23 and shunt capacitor 22 or 26. The purpose of these low-pass filters is further to limit the rapidity with which changes in the signal voltages applied to control grids 20 and 24 can take place.

Vacuum tubes 21 and 25, which are also preferably triodes having a relatively high amplification factor, individually operate as amplifiers, the value of common cathode-bias resistor 29 being so chosen that cathodes 27 and 28 are positive by a suitable amount with respect to control grids 20 and 24 which, in the presence of no signal, are substantially at ground potential. Because of the relatively high resistance of common cathode resistor 29, vacuum tubes 21 and 25 operate together as a so-called cathode phase inverter, in such a manner that the output signal voltage appearing between output terminals 34 and 35 is directly proportional to the difference in the signal voltages applied to control grids 20 and 24. This output voltage, however, is substantially independent of the absolute values of the signal voltages applied to these control grids.

Figure 2A:
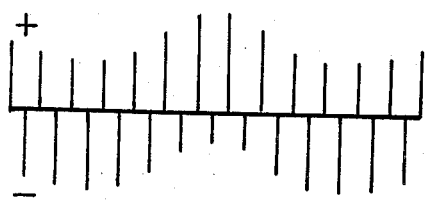

The operation of the detection system shown in Fig. 1 of the drawings in the presence of an input signal will be clearer by reference to the curves shown in Figs. 2a, 2b, 2c and 2d. Fig. 2a shows the pulsed signal voltage of the unbalanced magnetometer 40 which is applied between control grid 6 of vacuum tube 8 and control grid 7 of vacuum tube 9. It will be observed that the pulses alternate in polarity, and that increases in the magnitude of the positive pulses are accompanied by decreases in the magnitude of the negative pulses. Such a pulsed signal voltage is typical of that produced by permeability magnetometers of the type with which the detection system of the present invention is especially adapted to operate.

Figure 2B:
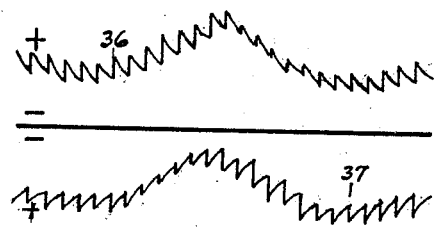

Curve 36 of Fig. 2b shows the voltage appearing at cathode 11 of vacuum tube 8 due to the signal voltage shown in Fig. 2a. Likewise, curve 37 shows the voltage appearing at cathode 12 of vacuum tube 9. It will be observed that, due to the time constant of the combination of resistor 13 or 14 and capacitor 17 or 18, the pulsed signal voltage is smoothed out into a voltage having much less marked changes in magnitude.

Figure 2C:
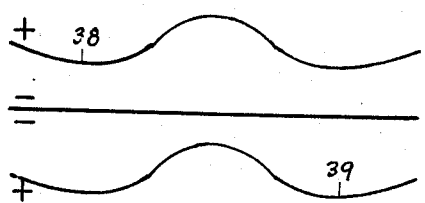

Fig. 2c shows, in curve 38, the voltage which is applied to control grid 20 of vacuum tube 21 and, in curve 39, the voltage which is applied to control grid 24 of vacuum tube 25. In each case, the small irregularities noted in curves 36 and 37 of Fig. 2b have been smoothed off, by the action of the low-pass filters respectively comprising series resistors 19 and 23 and shunt capacitors 22 and 26.

Figure 2D:
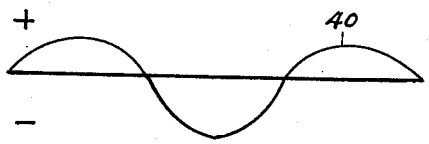

Fig. 2d shows the signal voltage which is developed between output terminals 34 and 35. This output voltage is directly proportional to the difference between the voltages portrayed by curves 38 and 39 of Fig. 2c.

Observing the curves of Fig. 2 as a whole, which are plotted on a common time base, it will be noted that the polarity of the output voltage, as shown in Fig. 2d, depends upon whether the positive or the negative pulses of the input signal, shown in Fig. 2a, have the larger magnitude. The amplitude of the output signal depends upon the extent to which the magnitude of the larger pulses exceeds that of the smaller pulses of the input signal.

In one successful embodiment in accordance with the present invention, transformer 4 had an overall step-up turns ratio of 25 to 1. Vacuum tubes 8, 9, 21 and 25 were type 6K5G. The voltage at B+ was 180 volts, and that at C— was —45 volts. The following values of resistors and capacitors were employed:

| | | |
|---|---|---|
| Resistor 10 | megohms | 0.25 |
| Resistors 13 and 14 | do | 2.0 |
| Resistors 19, 23, 32 and 33 | do | 0.5 |
| Resistor 29 | do | 0.2 |
| Capacitors 17 and 18 | microfarads | 0.004 |
| Capacitors 22 and 26 | do | 0.02 |

It will be understood that these constants are given merely by way of example, and that they may be varied over wide limits without departing from the scope of the invention. It will also be understood that vacuum tubes 8 and 9 or vacuum tubes 21 and 25 may be replaced by single tubes incorporating separate groups of electrodes within the same envelope, or that individual tubes of types other than that stated above may be employed. It will be obvious that the turns ratio of transformer 4 depends to a large extent upon the particular magnetometer with which the detection system is to be used, and therefore may be chosen to have any suitable value.

The output of the detection system in accordance with the present invention may be employed directly to actuate an indicating or recording instrument of suitable sensitivity, or the output may be supplied to a low-frequency amplifier of any desired type, the output of which in turn supplies an indicator or recorder of relatively lower sensitivity. If desired, a microammeter may be connected between taps on load resistors 32 and 33 for the purpose of securing output indications, without departing from the scope of the invention.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Means for converting an input signal consisting of a series of pulses of alternate polarity and varying magnitude into an output signal whose magnitude is substantially proportional to the difference in magnitude of said alternate input signal comprising, means for demodulating the signals comprising a balanced demodulator of the cathode follower type, means for placing a capacitive load on the demodulator cathodes, means for filtering the demodulated signals, and means for inverting the phase of the demodulated signals comprising a cathode phase inverter comprising a pair of vacuum tubes having a common cathode resistor and separate loads, said means for filtering being directly connected to the control grids of said cathode phase inverter.

2. In a magnetometer of the permeability type which utilizes an alternate driving voltage, means for converting an input signal consisting of a series of pulses of alternate polarity and varying magnitude into an output signal whose magnitude is substantially proportional to the difference in magnitude of said alternate input signals comprising a signal source for providing a signal, means for demodulating the signal comprising a plurality of electronic discharge devices each having a cathode, grid and plate, each cathode being connected to a negative source of potential through a resistance, capacitors connected across said resistances, each grid being connected to the other through the signal source, and said plates being connected to a positive source of potential, means for filtering the demodulated signals, and cathode phase inverter means for inverting the phase of the demodulated signals comprising a pair of vacuum tubes having a common cathode resistor and separate loads said means for filtering being directly connected to the control grids of said cathode phase inverter.

3. In a magnetometer of the permeability type which utilizes an alternative driving voltage, means for converting an input signal consisting of a series of pulses of alternating polarity and varying magnitude into an output signal whose magnitude is substantially proportional to the difference in magnitudes of said alternative input signals comprising, means for demodulating the signals comprising a plurality of electronic discharge devices each having a cathode, grid, and plate, a plurality of resistances, each cathode being connected to ground through a resistance, a plurality of capacitors, a capacitor being connected across each resistance, said grids being connected to each other through the signal source, said plates being connected to a positive source of potential, means for filtering the demodulated signals, and means for obtaining the difference of potential of the demodulated signals.

4. In a magnetometer, means for converting an input signal consisting of a series of pulses of alternate polarity and varying magnitude into an output signal whose magnitude is substantially proportional to the difference in magnitude of said alternate input signals comprising, means for demodulating said signals comprising balanced demodulators of the cathode follower type, means placing a capacitative load on the demodulator cathodes, means for filtering the demodulated signals, and means for obtaining the difference of potential of the demodulated and filtered signals.

5. In a magnetometer of the permeability type, means for converting an input signal consisting of a series of pulses of alternate polarity and varying magnitude into an output signal whose magnitude is substantially proportional to the difference in magnitude of said alternate input signals comprising, means for demodulating the signals comprising balanced demodulators of the cathode follower type including capacitative load means, said last mentioned means being placed on the demodulator cathodes, means for filtering the demodulated signals, and means connected to said filter outputs for obtaining the difference of potential of the demodulated signals.

References Cited in the file of this patent

UNITED STATES PATENTS

| Number | Name | Date |
|---|---|---|
| 2,185,367 | Blumlein | Jan. 2, 1940 |
| 2,208,349 | Ulbricht | July 16, 1940 |
| 2,252,059 | Barth | Aug. 12, 1941 |
| 2,256,077 | Crosby | Sept. 16, 1941 |
| 2,356,567 | Cockrell | Aug. 22, 1944 |
| 2,390,051 | Barth | Dec. 4, 1945 |
| 2,418,284 | Winchel et al. | Apr. 1, 1947 |

OTHER REFERENCES

Ser. No. 402,530, Barth (A. P. C.), published May 18, 1943.